US007037234B2

(12) United States Patent
Kahlon et al.

(10) Patent No.: US 7,037,234 B2
(45) Date of Patent: May 2, 2006

(54) ISA ENGINE START-UP STRATEGY

(75) Inventors: Gurinder Singh Kahlon, Canton, MI (US); James J. Klocinski, Saline, MI (US); Ning Liu, Novi, MI (US); Shawn Harold Swales, Canton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/731,936

(22) Filed: Dec. 10, 2003

(65) Prior Publication Data
US 2004/0127327 A1 Jul. 1, 2004

Related U.S. Application Data

(62) Division of application No. 10/159,785, filed on May 31, 2002, now Pat. No. 6,752,741.

(51) Int. Cl.
*B60K 41/02* (2006.01)
(52) U.S. Cl. .......................................... 477/5; 477/167
(58) Field of Classification Search ................. 477/35, 477/110, 167, 181; 180/65.1–65.3
See application file for complete search history.

(56) References Cited

U.S. PATENT DOCUMENTS

| 4,416,360 A | * | 11/1983 | Fiala ............................. 477/5 |
| 4,533,011 A | * | 8/1985 | Heidemeyer et al. ...... 180/65.2 |
| 4,607,312 A | | 8/1986 | Barreto-Mercado |
| 5,188,070 A | * | 2/1993 | Otsuka et al. .............. 477/167 |
| 5,566,774 A | | 10/1996 | Yoshida |
| 6,019,183 A | * | 2/2000 | Shimasaki et al. ........ 180/65.2 |
| 6,048,289 A | | 4/2000 | Hattori et al. |
| 6,176,807 B1 | | 1/2001 | Oba et al. |

(Continued)

FOREIGN PATENT DOCUMENTS

GB 2368664 5/2002

(Continued)

OTHER PUBLICATIONS

UK Search Report, Sep. 11, 2003.

*Primary Examiner*—Roger Pang
(74) *Attorney, Agent, or Firm*—Brinks Hofer Gilson & Lione

(57) ABSTRACT

There is provided a method for automatic operation of a vehicle comprising an engine, a starter motor, an engine clutch, and a plurality of vehicle systems. After detecting that the engine is running, the vehicle systems are checked to ensure an acceptable status for shutting down the engine. A negative torque is applied to the engine to shut it down. Vehicle systems are monitored until they indicate that the engine should be restarted. The engine is restarted, and a successful start of the engine is then confirmed. Similarly, there is provided a method for the cold start of a vehicle as above. The starter motor is powered up with an initial torque and vehicle systems are monitored to determine whether the engine should be started. The engine is started from the torque of the starter motor, and a successful start of the engine is then confirmed.

8 Claims, 6 Drawing Sheets

| U.S. PATENT DOCUMENTS | | | |
|---|---|---|---|
| 6,202,776 B1 | 3/2001 | Masberg et al. | |
| 6,352,489 B1 | 3/2002 | Kuroda et al. | |
| 6,616,569 B1 * | 9/2003 | Hoang et al. | 477/3 |
| 2002/0059019 A1 * | 5/2002 | Nakao et al. | 180/65.3 |
| 2002/0074173 A1 | 6/2002 | Morimoto et al. | |
| 2002/0163197 A1 | 11/2002 | Koelle et al. | |
| 2003/0144111 A1 * | 7/2003 | Kato | 477/92 |

| FOREIGN PATENT DOCUMENTS | | |
|---|---|---|
| JP | 63248936 | 10/1988 |
| JP | 11030139 | 2/1999 |
| JP | 11257122 | 9/1999 |
| JP | 2002031023 | 1/2002 |
| JP | 2002047964 | 2/2002 |

* cited by examiner

ISA ENGINE START-UP STRATEGY

The present application is a divisional of U.S. patent application Ser. No. 10/159,785, filed on May 31, 2002, now U.S. Pat. No. 6,752,741 the disclosure of which is incorporated herein by reference.

BACKGROUND OF THE INVENTION

In the daily use of a vehicle, especially in city or other congested traffic, the vehicle will often run in an idling state. Not only is this a waste of fuel for the vehicle operator, it is additionally harmful to the environment, due to the exhaust emissions of the vehicle.

In order to lessen such waste, some vehicles have already been equipped with an automatic start-stop system. In a conventional system, the engine of the vehicle will be automatically stopped when a pre-determined stopping condition occurs, such as idling of the engine for a certain length of time. The engine will then be restarted upon another signal, usually from the driver of the vehicle. These signals may be one such as having the driver touch the gear shift lever. Some systems merely evaluate conditions, such as the engine idle time, to determine when to stop; others monitor specific vehicular conditions, such as the temperature of exhaust gas purifying catalysts, in order to preserve the environment. Such systems are disclosed in U.S. Pat. Nos. 5,566,774 and 6,202,776. However, drive systems using methods such as these have had many problems that have hindered more universal adoption.

For example, the resonation frequency of the engine mounting system may coincide with a rotating frequency of the engine on deceleration. The harmonic resonance of both together can cause the car to shake. Additionally, a vehicle operator may experience a time lag during automatic engine restart. This time lag is due to the time associated with engine cranking and firing. A vehicle may also end up immobilized in traffic. If the automatic start-stop method stops the engine, but fails to successfully restart it, the vehicle may become stranded in the middle of a street, causing a distraction to other drivers and danger to the operator. Outside conditions may also make restart difficult, such as the ambient temperature.

BRIEF SUMMARY OF THE INVENTION

According to one aspect of the present invention, there is provided a method for automatic operation of a vehicle. The vehicle preferably comprises a vehicle engine, a starter motor linked to said vehicle engine through an engine clutch, and a plurality of vehicle systems linked to said starter motor. The vehicle first detects whether the engine is running. The status of the vehicle systems are ascertained to ensure that the conditions are proper for shutting down the engine. A negative torque is applied to the vehicle engine by connecting it to the starter motor through the engine clutch. Vehicle systems status is then monitored until the conditions indicate that the vehicle engine should be restarted. The vehicle engine is restarted by connecting it with the starter motor through the engine clutch. A successful start of the vehicle engine is then confirmed.

According to another aspect of the present invention, there is provided a method for starting a vehicle from a cold start. The vehicle preferably comprises a vehicle engine, a starter motor linked to the vehicle engine through an engine clutch, and a plurality of vehicle systems linked to the starter motor. The starter motor is first independently started. Vehicle systems status is checked to determine whether the vehicle engine should be started. A torque is applied to the vehicle engine by connecting it with the starter motor through the engine clutch. A successful start of the vehicle engine is then confirmed.

Other aspects of the present invention will become apparent in connection with the following description of the present invention.

DETAILED DESCRIPTION OF THE INVENTION

Figure 1:
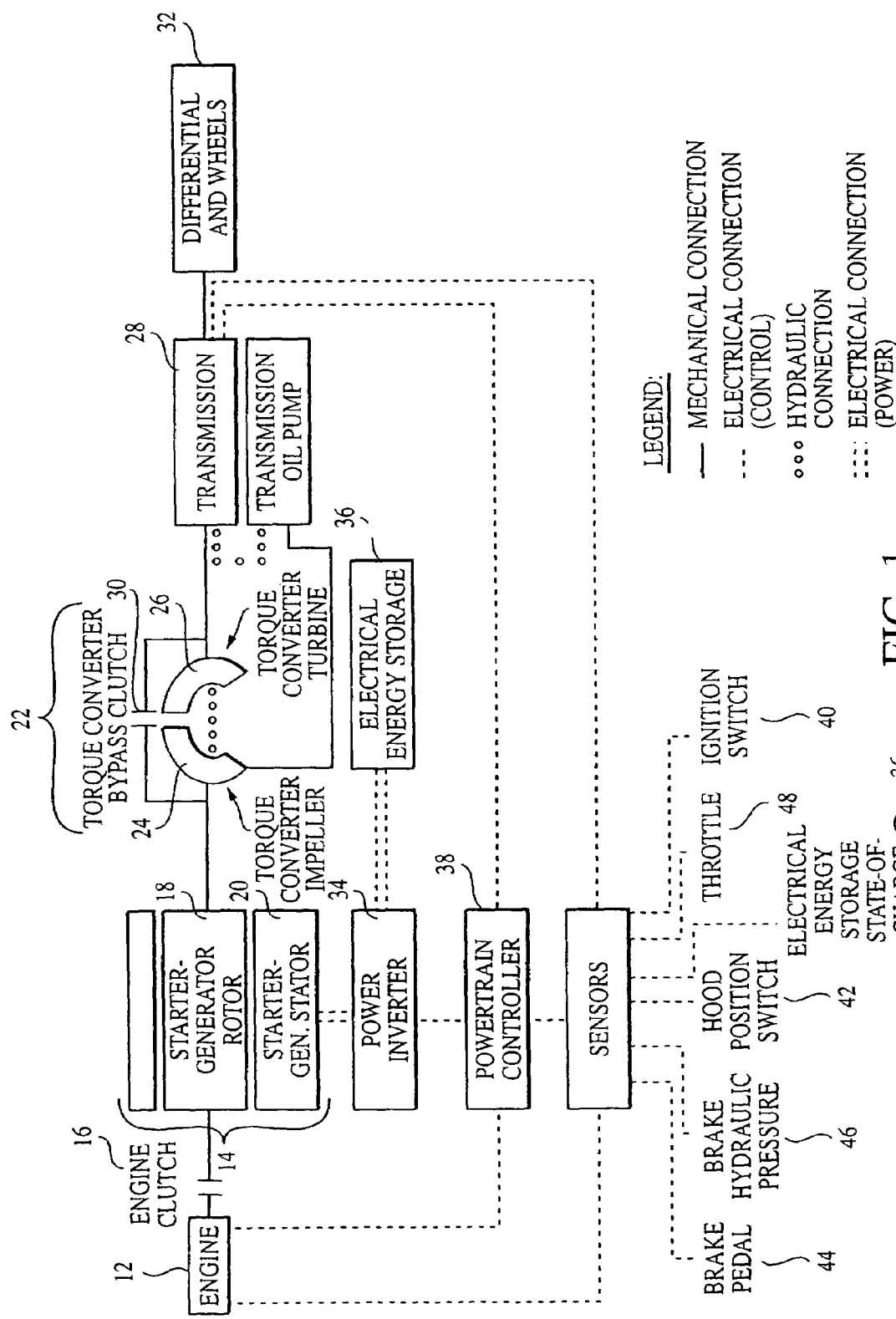
FIG. 1 is a schematic diagram illustrating the relevant parts of a vehicle engine and drive system that may be used to implement the present embodiment of the invention.

FIG. 1 is a schematic diagram showing the preferred apparatus for implementing the preferred embodiment of the method of the present invention. Other additional vehicular systems may be included within the method depending on a preferred mode of practice, as further discussed below.

As shown in FIG. 1, starter-generator 14 is mechanically linked to the vehicle engine 12 via the engine clutch 16. The starter-generator 14 comprises a starter-generator rotor 18, linked to the rotating parts of the powertrain, and a starter-generator stator 20, the stationary part of the starter-generator. The engine clutch 16 preferably includes plates linked to each of the vehicle engine 12 and the starter-generator rotor 18 that may interface to provide a driving force from the starter-generator rotor 18 to the vehicle engine 12. The starter generator rotor 18 is directly linked to the torque converter 22. The torque converter 22 preferably includes a torque converter impeller 24 and a torque converter turbine 26. Torque delivered to the torque converter impeller 24 from the starter-generator rotor 18 is transmitted hydraulically to the torque converter turbine 26. The torque converter turbine 26 is mechanically connected to the input shaft of the transmission 28. Also provided is a torque converter bypass clutch 30, which is designed similarly to the engine clutch 16. The torque converter bypass clutch 30 can be used to transmit the torque from the starter-generator rotor 18 directly to the transmission 28. As is well known in the art, the transmission 28 is further connected to a differential gear set 32. In the preferred embodiment, the transmission 28 is of the automatic type, although manual transmissions, such as clutch-operated plate systems, may be used.

The starter-generator 14 is also electrically connected to a system which includes a power inverter 34, an electrical energy storage unit 36, and a powertrain controller 38. The powertrain controller 38 receives information from a number of sources, either directly or through one or more sensors. For example, the powertrain controller 38 can take information from a multi-position ignition switch 40. The multi-position ignition switch 40, which is linked to the starter-generator 14, can be switched to various positions by the vehicle operator, as described further below. As is well-known in the art, such a multi-position ignition switch 40 would preferably take the form of a lock mechanism that can physically receive a key, where turning the key to a first position would turn on the power to the vehicle, and turning the key to a second position would signal the start-up method to start the vehicle engine 12. Other methods or mechanisms, such as a remotely operating unit carried on a key chain or a voice or fingerprint-activated system could also be used.

The powertrain controller 38 can also receive information from one or more sensors attached to the hood 42 of the vehicle, configured to ascertain whether or not the hood 42 is open. Such a system can include electrical or optical sensors on both the hood 42 of the vehicle and the vehicle frame near the hood 42 that would break a circuit or other electrical or optical connection when the hood 42 is opened. The powertrain controller 38 can also receive information from one or more sensors located in the brake pedal 44. Such a system may include optical, electrical, or mechanical sensors to determine the position of the brake pedal 44. Further information can be transmitted from the brake hydraulic system 46 to the powertrain controller 38 as received from a mechanical or optical sensor. Changes in the hydraulic pressure, combined with the rate with which those changes are made, can be monitored.

Electrical sensors may also receive information from the state of charge of the electrical energy storage system 36. The energy, which is created by the starter-generator 14 and storable in an electrical energy storage cell 36, can be monitored to determine the amount of charge available. An electrical, optical, or mechanical sensor can monitor the throttle 48 of the vehicle. Such a sensor can monitor the position of the accelerator pedal, as well as monitor the throttle system 48 to determine when pressure is being applied to or released from the throttle 48. The vehicle systems monitored with sensors here are preferred embodiments; however, many other vehicle systems could be monitored with sensors as well.

Figure 2:
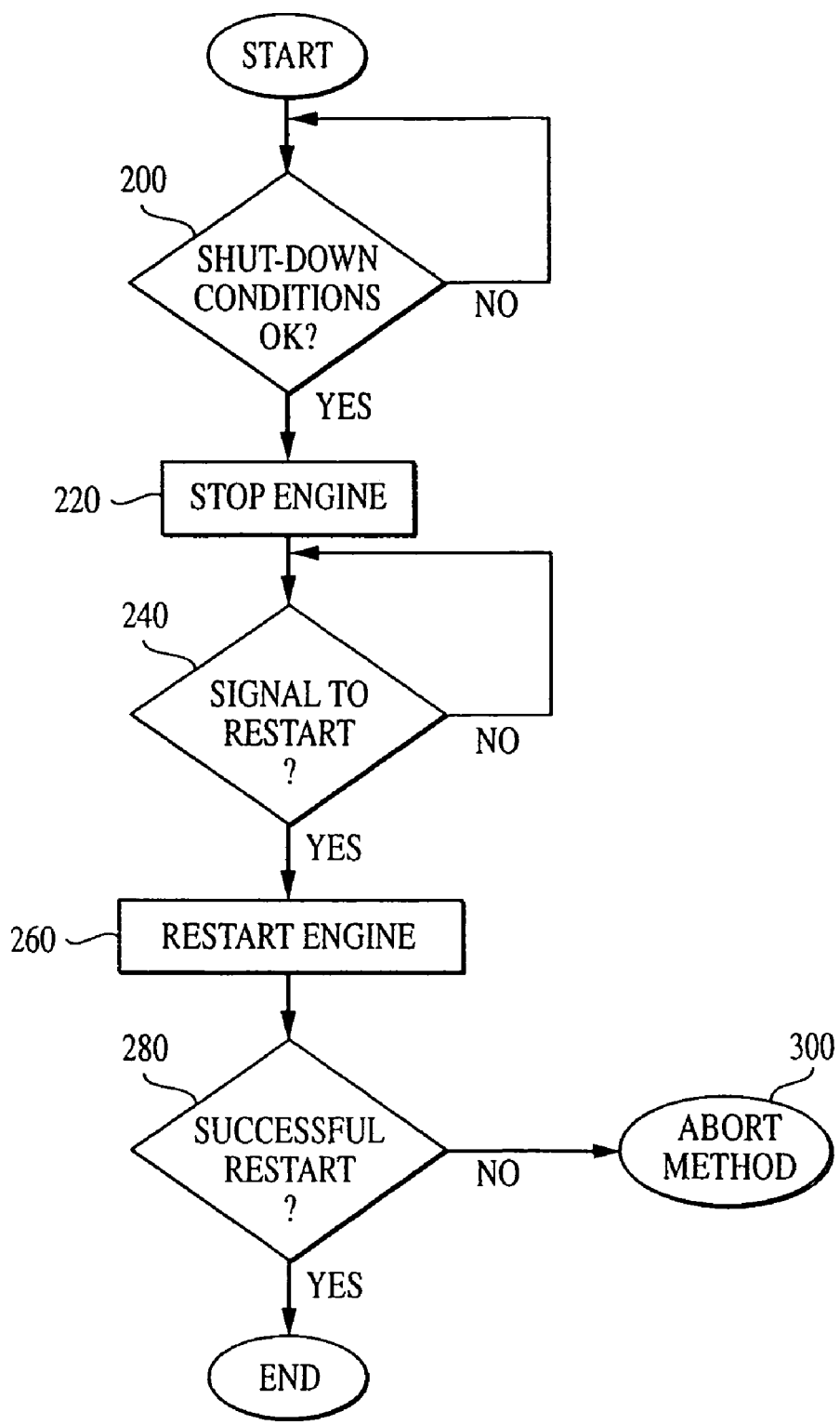
FIG. 2 is a flow diagram illustrating one embodiment of the start-stop method of the present invention.

FIG. 2 is an overview flow diagram of one preferred embodiment of the start-stop process. First, the vehicle systems are constantly monitored in a loop until the conditions are acceptable for stopping the engine at box 200. The engine is then stopped at box 220. At that point, a second monitoring loop monitors the systems of the vehicle at box 240, as well as any potential inputs by the vehicle operator to signal that the vehicle engine should be restarted. When such a signal is received, the engine is restarted at box 260. The system then checks to confirm that the engine has restarted successfully at box 280. If it has, the start-stop process is complete. The vehicle system can then restart the process and monitor the vehicle again to determine when it is appropriate to stop the vehicle at box 200. If the engine has not successfully restarted, the method may be aborted at box 300.

Figure 3:
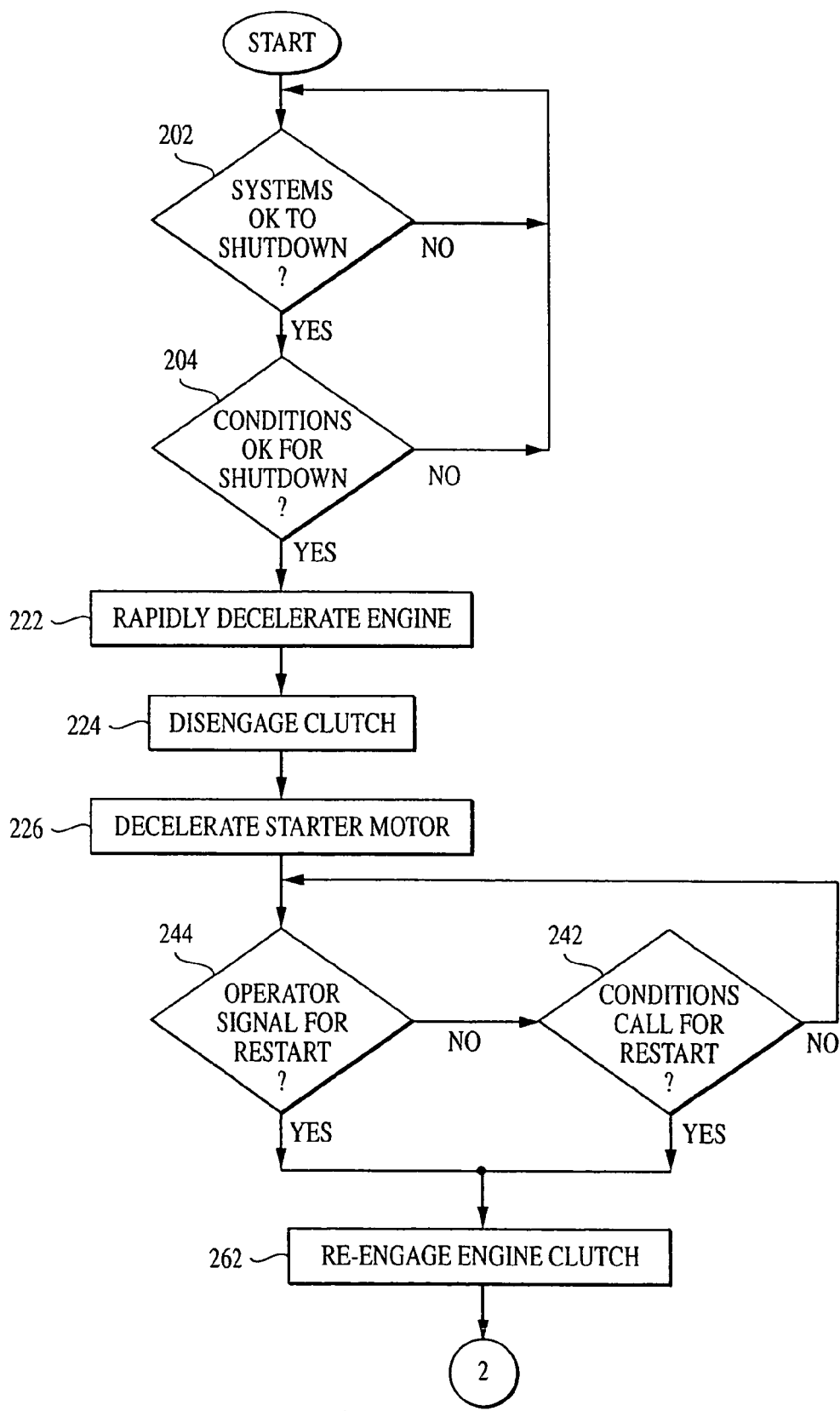
FIG. 3 is a flow diagram illustrating the embodiment of FIG. 2 of the start-stop method of the present invention in more detail.
Figure 3:
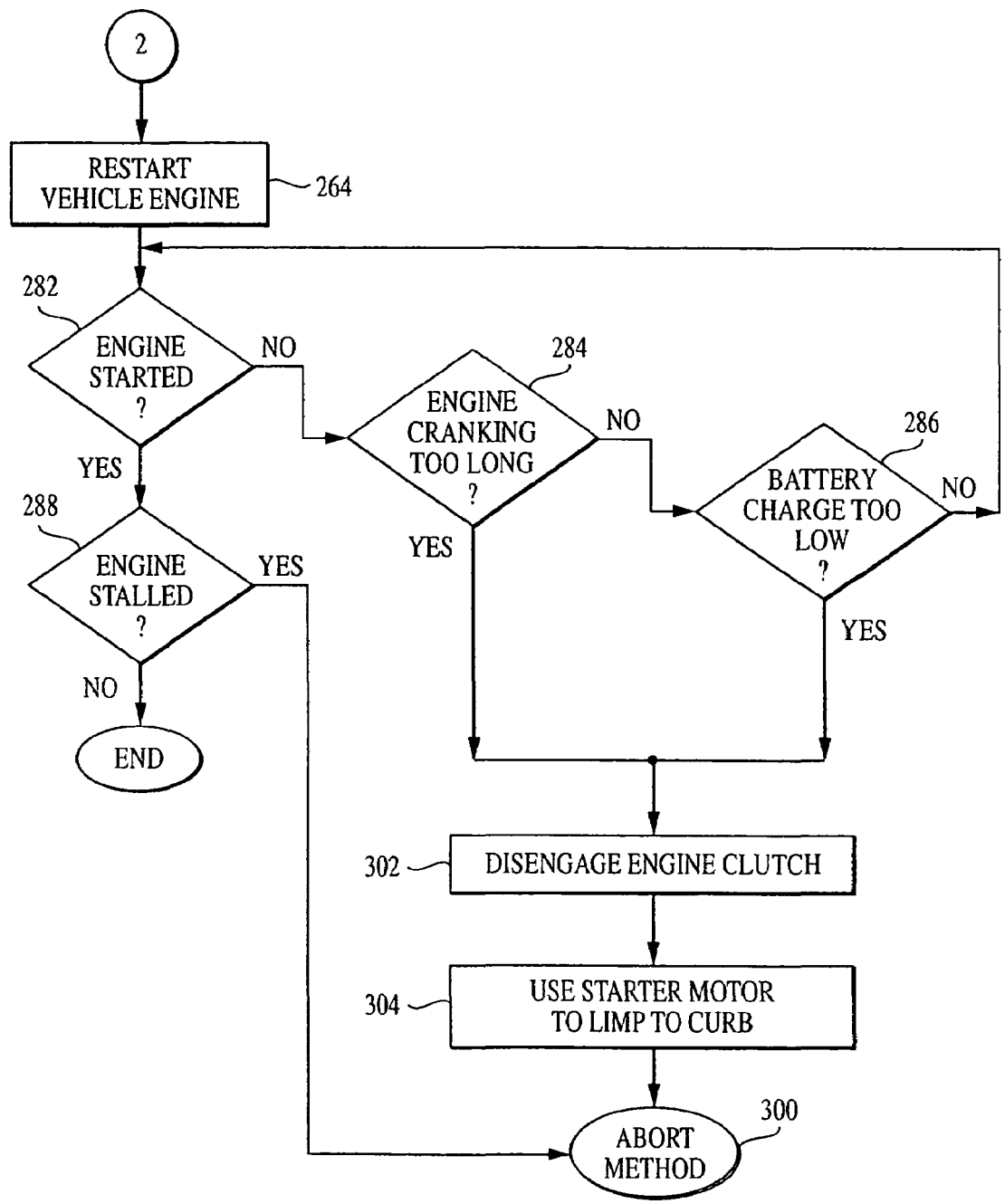

FIG. 3 is a flow diagram illustrating the embodiment of the start-stop process of FIG. 2 in more detail. The first monitoring loop at box 200 has been broken down into two sub-steps. First, the systems of the vehicle are reviewed at box 202 to confirm that all vehicular conditions are acceptable for stopping the vehicle engine 12. In a preferred embodiment, the gear differential 32 must be engaged properly. In such an embodiment, the position of the multi-position ignition switch 40 is also detected by the powertrain controller 38 so as to verify that the vehicle engine 12 is running. Both the engine clutch 16 and the transmission 22 are preferably properly engaged. The vehicle engine 12 is also preferably running. This serves to ensure that the shut down of the vehicle engine 12 will not occur at an inopportune time, such as when the vehicle is traveling on the highway. To that same end, it is preferably confirmed that the vehicle is not moving and that the braking system 46 is engaged. The engagement of the braking system 46 could be via the parking brake, or via pressure on the brake pedal 44, such as from a vehicle operator in rush-hour traffic. Similarly, the throttle 48 of the vehicle is preferably not engaged. As stated, the vehicle systems monitored are those in a preferred embodiment; however, many other vehicle systems could be reviewed in this step.

As a second step, this method also confirms that the ambient conditions are proper to allow for restart at box 204 of the vehicle engine 12. Some moving parts of the vehicle are typically sensitive to changes in the temperature. If the temperature outside is too cold, the amount of torque from the starter-generator 14 necessary to crank the vehicle engine 12 may increase. In such a situation, it would be preferable for the start-stop method not to be enabled until the ambient temperature is more suited for quick vehicle engine restart.

The act of stopping the vehicle engine 12 at box 220 is further illustrated as sub-steps 222 through 226 in FIG. 3. First, the starter-generator 14 is used to rapidly decelerate the vehicle engine 12. The vehicle engine 12 and its mounting apparatus, like all mechanical systems, have certain resonant frequencies. This is the frequency at which the apparatus will reverberate loudly or otherwise start to shake. This effect, however, will only take place within a small range of frequencies centered on that resonation frequency. When a vehicle engine 12 is decelerated, the rotational frequency of the vehicle engine 12 will likely pass through the resonation frequency. When it does, as discussed above, the vehicle engine 12 will begin to shake loudly, causing an audible disturbance to the vehicle operator and affecting the smoothness of the drive. The rapid, controlled deceleration of the vehicle engine 12 serves to solve this problem. By minimizing the time it takes to bring the vehicle engine 12 to rest, the rotational frequency of the vehicle engine 12 is within the range of the resonating frequency for a significantly decreased time. The deceleration is accomplished by applying a negative torque—a torque in the opposite direction of the running vehicle engine 12. A negative torque is imparted to the starter-generator 14. The vehicle engine 12 and the starter-generator 14 are then linked together through the engine clutch 16. The opposing torque decelerates the vehicle engine 12 more rapidly than merely applying the braking system 46 to the vehicle engine 12. After the vehicle engine 12 is successfully decelerated, the engine clutch 16 is disengaged at box 224, cutting the link between the vehicle engine 12 and the starter-generator 14, and finally the starter-generator rotor 18 is decelerated to an idling speed at box 226.

While the vehicle engine 12 is not running, it is important to keep the gearing of the transmission 28 rotating. In fact, most of the clutches of the vehicle, such as the engine clutch 16, are held closed only by the hydraulics of the transmission 28. In order to ensure that the engine clutch 16 can function when the vehicle is restarted, the transmission 28 must remain in operation. With the current configuration of the engine, the transmission can be directly connected to the starter-generator 14, either through the torque converter 22 or via the torque converter bypass clutch 30. Since the starter-generator 14 continues to run at idle speed, even when the vehicle engine 12 has shut down, the transmission 28 also continues to run.

The next step of the presently preferred method is to monitor the systems of the vehicle, at box 240, for signals or parameters that indicate that the vehicle should restart. These signals could originate from the status of the vehicular systems, at box 242, as well as from the vehicle operator indicating that the operator wishes the vehicle engine 12 to restart, at box 244. The status of some vehicle systems can indicate that the vehicle should be restarted in order to avoid any problems with the vehicle or the restart procedure. Vehicle systems that may be checked and/or monitored include:

- Length of vehicle engine cranking time. If the vehicle has been inactive for too long, restart may be difficult. Therefore, a time limit can be set on the length of time the vehicle will remain in shut-down status before the vehicle engine 12 is restarted.
- Temperature of vehicle engine. As before, as the temperature of vehicle engine 12 decreases, so do the temperatures of various vehicle engine 12 parts, such as the engine catalyst and the engine cylinders. The engine catalyst is only effective over a certain temperature, and an ineffective catalyst may cause engine problems. If the temperature of the engine cylinders becomes too cold, there may be excess vehicle exhaust emissions beyond the legal limits. Therefore, another check may be added to signal a restart of the vehicle engine 12 when it reaches a certain threshold temperature.
- State of charge. The state of charge of the electrical energy storage unit 36 is also important. As the starter-generator 14 idles, the transmission 28, as well as other parts of the vehicle, continues to operate. The energy of the electrical energy storage unit 36 continues to drain. If the state of charge is depleted beyond a certain level, the electrical energy storage unit 36 may not be able to provide enough power to later start the engine 12. Therefore, the vehicle engine 12 should be restarted if the state of charge of the electrical energy storage unit 36 becomes too depleted to ensure a successful restart.
- Physical position of hood. Also, the vehicle engine 12 should preferably not restart if the vehicle hood 42 is open. Generally, if the hood 42 is open, a vehicle operator is working on the vehicle itself. Therefore, it is generally unsafe to start or run the vehicle engine 12 while the hood 42 is open. Therefore, a check may be made by the method to ensure that the vehicle does not start while the hood 42 is open. Such a check could preferably be made with electrical or optical sensors on both the hood 34 of the vehicle and the vehicle frame near the hood 34.

These parameters are preferred embodiments of the invention; however, many other vehicle systems could be monitored in this step.

For example, the vehicle operator may, by his actions, also signal that he would like to have the vehicle engine 12 restart, as shown at box 244. Among the methods that an operator might choose to signal that the engine should restart is to change the brake hydraulic pressure 46 by releasing the brake, changing the gear differential 32 position, or by opening the throttle 48 of the vehicle. These signals would be detected and used to initiate a restart so that the vehicle engine will be fully restarted when the vehicle operator wants to accelerate with little noticeable delay.

According to the embodiment disclosed in FIG. 3, the signals from the vehicle systems are checked at box 242 after monitoring signals from the vehicle operator at box 244. However, these two actions can be completed in an interchangeable order, or they can be done in parallel. According to different embodiments of the present invention, the operator signals have been checked first, as well as other embodiments where different elements of each group of tests were done in parallel, or in a mixed serial order.

The next step of the present invention is to restart the vehicle engine 12 when a signal is received, as at box 260. This step consists of two separate actions, as shown in sub-steps 262 and 264 in FIG. 3. First, the engine clutch 16 is engaged at box 262, linking together the vehicle engine 12 and the starter-generator 14, which already has some torque. The vehicle engine 12 is then restarted at box 264 with the starter-generator 14. The torque of the starter-generator 14 is imparted to the vehicle engine 12 through the engine clutch 16, thereby starting the vehicle engine 12.

Engine creep is also a concern throughout the restart of the vehicle in the present invention. Engine creep is the slow forward movement of a standard vehicle when an operator removes pressure on the brake, but has not yet engaged the accelerator. It is desirable that engine creep be implemented in the present invention as well, as it makes the start-stop procedure less noticeable to the user. A small amount of hydraulic pressure is retained in the torque converter 22, as discussed earlier. The powertrain controller 38 is configured to monitor the brake hydraulic pressure 46 and to impart a small amount of torque to the vehicle upon release of the brake hydraulic pressure 46. This small amount of torque is just enough to create the engine creep effect.

The successful restart of the vehicle also needs to be verified at box 280. This step can be broken into substeps, as illustrated in boxes 282 through 288 in FIG. 3. The first sub-step of this verification is to determine whether or not the vehicle engine 12 has actually started, at box 282. This is done by determining the current speed of the vehicle engine 12, measured in terms of the angular velocity of the vehicle engine 12, and comparing it to the vehicle engine 12 speed required for engine idling. If the vehicle engine 12 speed has not exceeded the idle speed, the vehicle engine 12 will be tested to see if it has been cranking for longer than a pre-determined length of time at box 284. Additionally, the state of charge of the electrical energy storage unit 36 will be measured and compared to another set level at box 286 to check if said state of charge has gotten too low. Either of these situations could be detrimental to the continued operation of the vehicle, as above. If either of these situations occur, the method will abort at box 300. If neither is true, then the method will continue to loop until either one of these conditions at box 284 or at box 286 has occurred, or the vehicle engine 12 has successfully started.

Once it is determined that the vehicle engine 12 has started, it will be further monitored for stalling at box 288. If the vehicle engine 12 has stalled, operation of the start-stop method ceases and a cold-start strategy is run at box 300. If the vehicle engine 12 continues to run properly, the method has completed successfully and ends. The vehicle is then ready to begin another start-stop maneuver, at box 200, at the next opportunity.

However, if the vehicle engine 12 has been cranking too long at box 284, or if the electrical energy storage unit 36 begins to run low on its state of charge at box 286, the method will abort into an emergency strategy at box 300. The engine clutch 16 will first be disengaged at box 302. The starter-generator 14 will then be used to give the vehicle a minimal amount of power so that the vehicle can move to the curb, a "limp to curb" strategy, at box 304. Rather than leave the vehicle stranded in the middle of traffic if the start-stop method fails, it is preferable to allow the operator a way to get the vehicle to the curb for roadside assistance. Having the starter-generator 14 run the basic functions of the vehicle will allow the operator a minimal amount of power to accomplish this. Once the vehicle is at the curb, the operator can call for assistance or make another attempt to start the vehicle.

Figure 4:
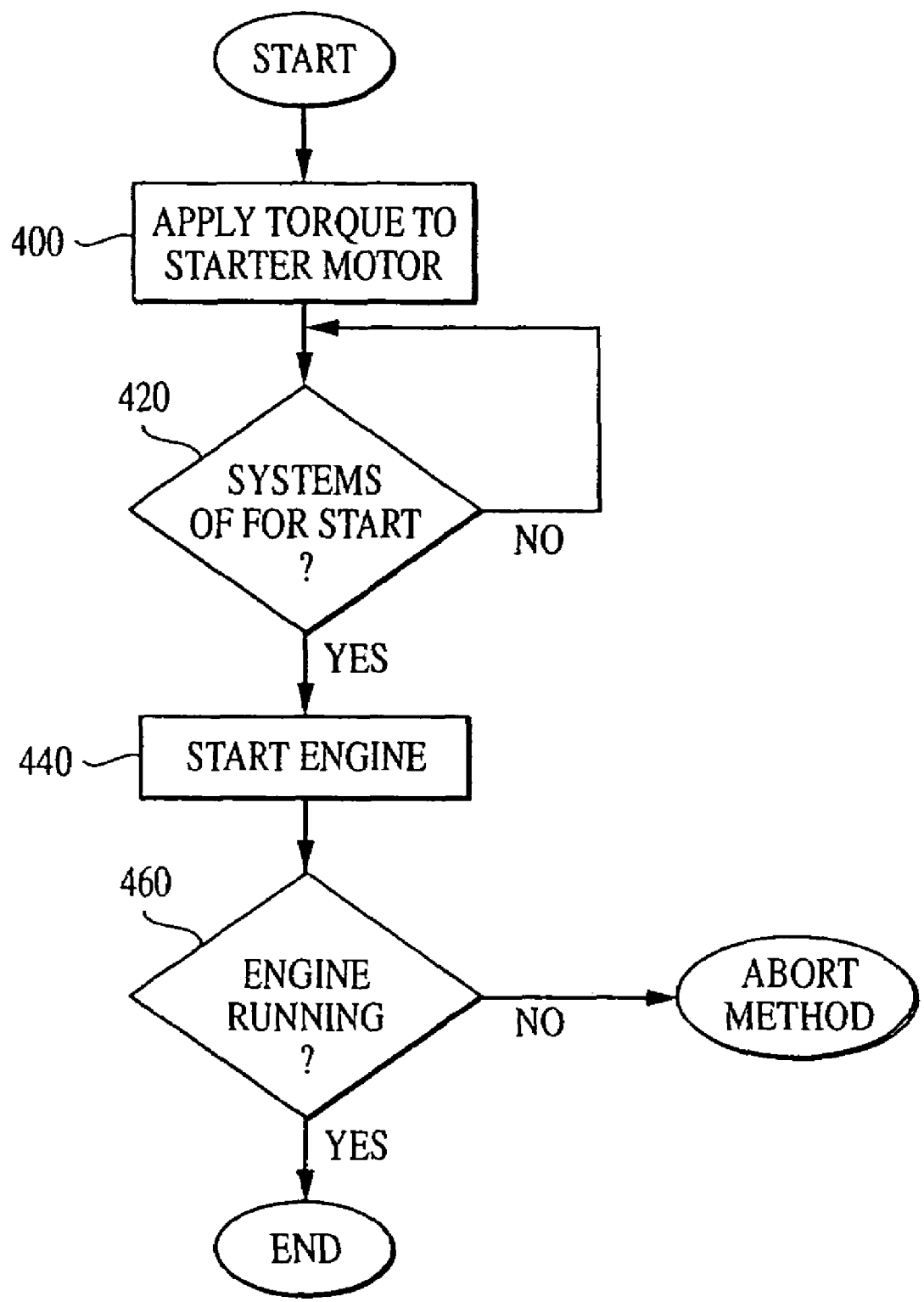
FIG. 4 is a flow diagram illustrating one embodiment of the cold start method of the present invention.

It is possible that if the vehicle engine 12 is stalled, or once a vehicle arrives at the curb, the operator may try to restart the vehicle engine 12 from a cold state. Such a cold start method can also be used to first start the vehicle upon entering the vehicle. FIG. 4 shows one embodiment in a flow diagram of such a method. The starter-generator 14 is powered up and given an initial torque at box 400. The systems of the vehicle are checked at box 420 to make sure that they are prepared for starting the vehicle engine. The engine 12 is then started at box 440. Finally, the vehicle engine 12 is checked to confirm it has successfully restarted at box 460.

Figure 5:
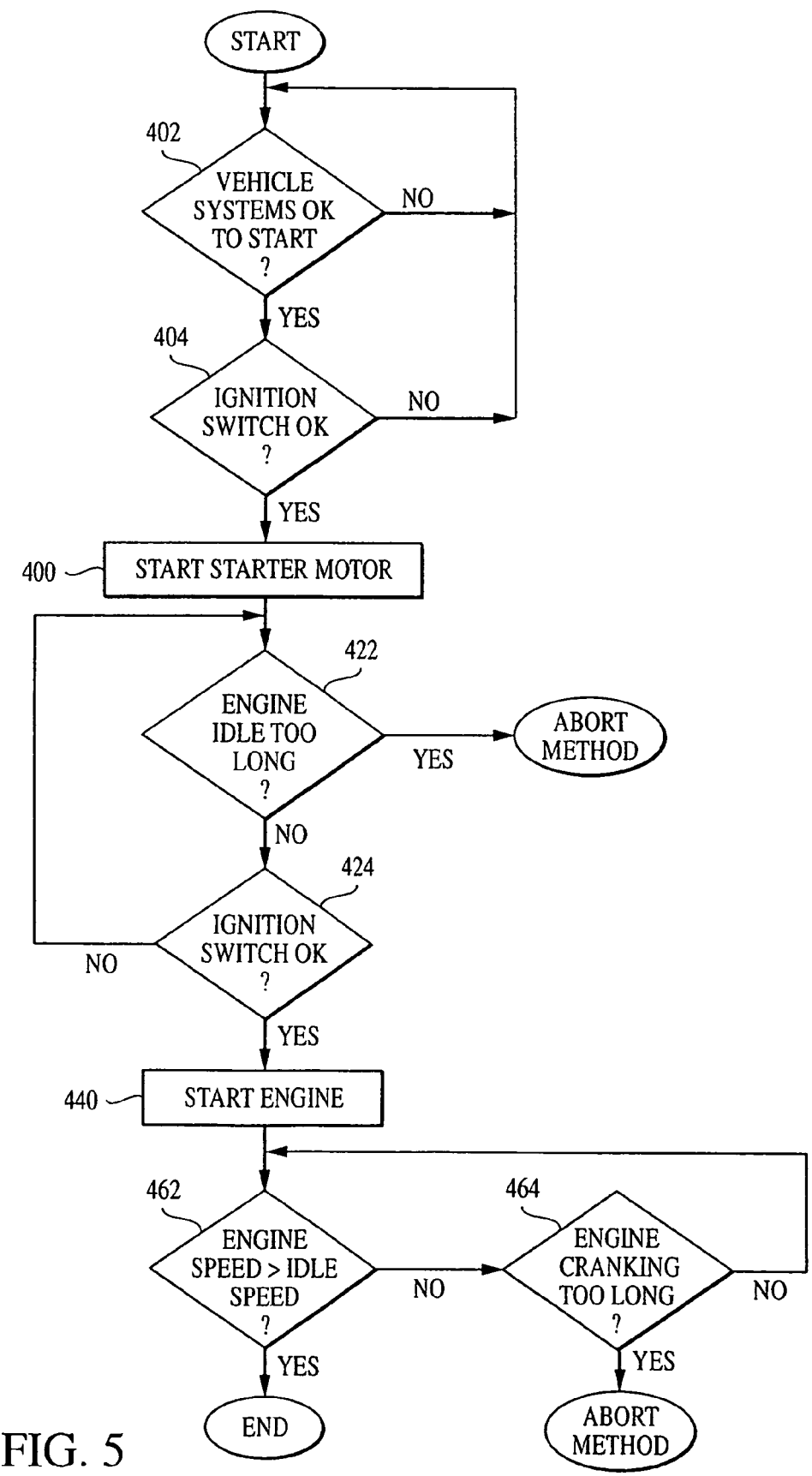
FIG. 5 is a flow diagram illustrating the embodiment of FIG. 4 of the cold start method of the present invention in more detail.

A more detailed version of this embodiment is set forth in FIG. 5. As a preliminary precaution before the starter-generator 14 is started at box 400, the systems of the vehicle are checked to verify that the system is in a proper state for an engine start at box 402. Systems that may be checked at this point include whether a gear 32, the transmission 28, or the engine clutch 16 are engaged. The state of each of these components of the vehicle drive system indicates whether the vehicle is in a proper state to begin to start the vehicle engine 12. Additionally, the vehicle engine 12 itself should be checked to see if it is already running. If so, then the vehicle does not need to be started. The method should be aborted and the vehicle returned to the beginning of a start-stop strategy.

Additionally, the multi-position ignition switch 40 should preferably be checked at box 404 before starting the starter-generator 14. A multi-position ignition switch 40 can have a pre-designated position to indicate that the vehicle operator wants to start the vehicle engine 12. This system check at box 404 will verify that the multi-position ignition switch 40 is set to that position, and not allow the vehicle to attempt to start until it is.

The starter-generator 14 is then powered up with a torque at box 400. By starting the starter-generator 14 at this earlier stage, it allows for a much faster start of the vehicle engine 12 later.

After the starter-generator 14 is given a torque, the vehicle systems are then evaluated to verify that they are in a proper state for starting the vehicle engine 12 at box 420. The sub-steps of this evaluation are illustrated in boxes 422 through 426 in FIG. 5. Such a method would preferably include checking the time that the starter-generator 14 was idling at box 422 as well as the position of the multi-position ignition switch 40 at box 424. As before, the multi-position ignition switch 40 would preferably include a position that corresponds to a signal by the vehicle operator to start the vehicle engine 12. The vehicle systems would then not proceed with the start-up process until the position of the multi-position ignition switch 40 is correct.

The engine 12 is next started at box 440 from the starter-generator 14. As earlier explained, the engine clutch 16 is engaged in order to bring the moving starter-generator 14 and the vehicle engine 12 in contact, imparting the torque of the starter-generator 14 to the vehicle engine 12. Finally, the method will verify that the vehicle engine 12 has started correctly at box 460. This verification is illustrated in boxes 462 and 464 in FIG. 5. The first part of this verification is to determine whether the engine is running at a speed above idle speed at box 462. If so, it is determined that the vehicle engine 12 has started correctly, and the cold start method will end. It is possible that at this time, the system will begin the warm start method, waiting in the first loops for an appropriate signal to shut down the engine at box 200 of FIGS. 2 and 3. If the vehicle engine 12 is not running above the idle speed, the vehicle will then check to see if it has been cranking without starting longer than a pre-determined time at box 464. If not, the conditions of vehicle engine 12 speed of box 462 and cranking time of box 464 will be continually monitored until the vehicle engine 12 is running at a speed higher than idle speed, or cranking has continued longer than the pre-determined time. If cranking has continued for an unacceptable length of time, the method will abort at box 466, at which time the starter-generator 14 will shut down, and the vehicle operator may try again to restart the vehicle.

Although the invention herein has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A method for starting a vehicle, said vehicle comprising a vehicle engine, a starter motor linked to said vehicle engine through an engine clutch, and a plurality of vehicle systems linked to said starter motor, said method comprising the steps of:
   starting said starter motor;
   checking the status of one or more of said vehicle systems to determine whether said vehicle engine should be started;
   applying a torque to said vehicle engine by connecting said vehicle engine with said starter motor through said engine clutch; and
   confirming whether said vehicle engine has successfully started
   providing a multi-position ignition switch linked to said starter motor;
   recognizing the initial status of one or more of said vehicle systems required to start said vehicle engine;
   detecting whether said multi-position ignition switch is not positioned in a pre-determined position for a set length of time; and
   shutting down the starter motor.

2. The method of claim 1, further comprising the steps of:
   providing a multi-position ignition switch linked to said starter motor;
   recognizing the initial status of one or more of said vehicle systems required to start said vehicle engine; and
   detecting whether said multi-position ignition switch is in a pre-determined position.

3. The method of claim 1, wherein said vehicle further comprises a set of gears linked to said starter motor through a transmission clutch, said initial status of one or more of said vehicle systems required to start said vehicle engine comprising at least one member of the following group:
   the engagement of said set of gears;
   the engagement of said transmission clutch;
   the engagement of said engine clutch; and
   the operation of said vehicle.

4. The method of claim 1, wherein said step of checking the status of one or more engine systems further comprises the steps of:

evaluating the amount of time said vehicle engine has idled without a start attempt; and detecting whether said multi-position ignition switch is in a pre-determined position.

5. The method of claim 4, further comprising the step of shutting down said starter motor if the amount of time said vehicle engine has idled reaches a predetermined length.

6. The method of claim 1, wherein said step of confirming whether said vehicle engine has successfully started further comprises the steps of:

evaluating whether the current angular velocity of said vehicle engine is greater than that of the vehicle engine while idle;

evaluating the time said vehicle engine has been cranking without starting, if said vehicle engine's speed is less than idle speed; and shutting down said starter motor if said time of cranking is greater than a pre-determined length of time.

7. A method for starting a vehicle, said vehicle comprising a vehicle engine, a starter motor linked to said vehicle engine through an engine clutch, and a plurality of vehicle systems linked to said starter motor, said method comprising the steps of:

starting said starter motor;

checking the status of one or more of said vehicle systems to determine whether said vehicle engine should be started;

applying a torque to said vehicle engine by connecting said vehicle engine with said starter motor through said engine clutch;

confirming whether said vehicle engine has successfully started;

evaluating the amount of time said vehicle engine has idled without a start attempt;

detecting whether said multi-position ignition switch is in a pre-determined position; and shutting down said starter motor if the amount of time said vehicle engine has idled reaches a predetermined length.

8. A method for starting a vehicle, said vehicle comprising a vehicle engine, a starter motor linked to said vehicle engine through an engine clutch, and a plurality of vehicle systems linked to said starter motor, said method comprising the steps of:

starting said starter motor;

checking the status of one or more of said vehicle systems to determine whether said vehicle engine should be started;

applying a torque to said vehicle engine by connecting said vehicle engine with said starter motor through said engine clutch;

confirming whether said vehicle engine has successfully started;

evaluating whether the current angular velocity of said vehicle engine is greater than that of the vehicle engine while idle;

evaluating the time said vehicle engine has been cranking without starting, if said vehicle engine's speed is less than idle speed; and shutting down said starter motor if said time of cranking is greater than a pre-determined length of time.

* * * * *